United States Patent [19]

Rathje et al.

[11] 4,199,038
[45] Apr. 22, 1980

[54] STEERING GEAR WITH STEERING DROP ARM

[75] Inventors: Uwe Rathje; Manfred Lappe, both of Dortmund, Fed. Rep. of Germany

[73] Assignee: O & K Orenstein & Koppel Aktiengesellschaft, Berlin, Fed. Rep. of Germany

[21] Appl. No.: 951,872

[22] Filed: Oct. 16, 1978

[30] Foreign Application Priority Data

Oct. 18, 1977 [DE] Fed. Rep. of Germany ....... 2746709

[51] Int. Cl.² .............................................. B62D 5/08
[52] U.S. Cl. .................................... 180/140; 180/135
[58] Field of Search .............. 180/132, 135, 140, 77 S; 280/91

[56] References Cited

U.S. PATENT DOCUMENTS

| | | | |
|---|---|---|---|
| 3,202,238 | 8/1965 | Strader | 180/140 |
| 3,724,585 | 4/1973 | Conrad | 180/140 |
| 3,856,102 | 12/1974 | Queen | 180/140 |
| 4,016,948 | 4/1977 | Kuester | 180/132 |
| 4,140,199 | 2/1979 | Liester | 180/140 |

Primary Examiner—Richard A. Bertsch
Assistant Examiner—Donn McGiehan
Attorney, Agent, or Firm—Martin A. Farber

[57] ABSTRACT

A steering gear with steering drop arm, steering tie rod and steering gear connecting tie rod for a vehicle, which is drivable on wheels on the road and terrain, with a steering mechanism which is actuated selectively hydraulically supported mechanically or purely hydraulically by means of hydraulic cylinders and electromagnetic valves, whereby changing from the hydraulically supported system to the purely hydraulically operating system is by means of a selective connection of a universal shaft, which is connected with the steering wheel, with one of the two systems which serve the actuation of the steering mechanism. A hydraulic pump, driven by a drive motor, and acting on both systems, is connected with a first control valve via a line, a flow control- and pressure limit- valve and a line. On the one hand a line leads from the first control valve to a steering transmission, the latter being actuated by the steering gear by means of universal shaft. Lines lead from the steering transmission to a second control valve. The latter is connected with the hydraulic cylinders of the front axle. On the other hand a line leads from the first control valve to a steering valve which is actuated by means of the steering gear and the universal shaft. Pressurized oil either via a line to a third control valve and via a line therefrom flows to the hydraulic cylinders of the front axle, or via a line to a fourth control valve and via a line therefrom, the third control valve and a line flows to the hydraulic cylinders. Or pressurized oil either the line to the third control valve and via the line therefrom to the hydraulic cylinders of the front axle as well as via a line to the third control valve and via a line therefrom, the fourth control valve and a line flows to the hydraulic cylinders of the rear axle, or the pressurized oil via the line to the fourth control valve and via a line to the hydraulic cylinders of the rear axle as well as via a line to the fourth control valve and via a line, the third control valve and a line flows to the hydraulic cylinders of the front axle.

5 Claims, 2 Drawing Figures

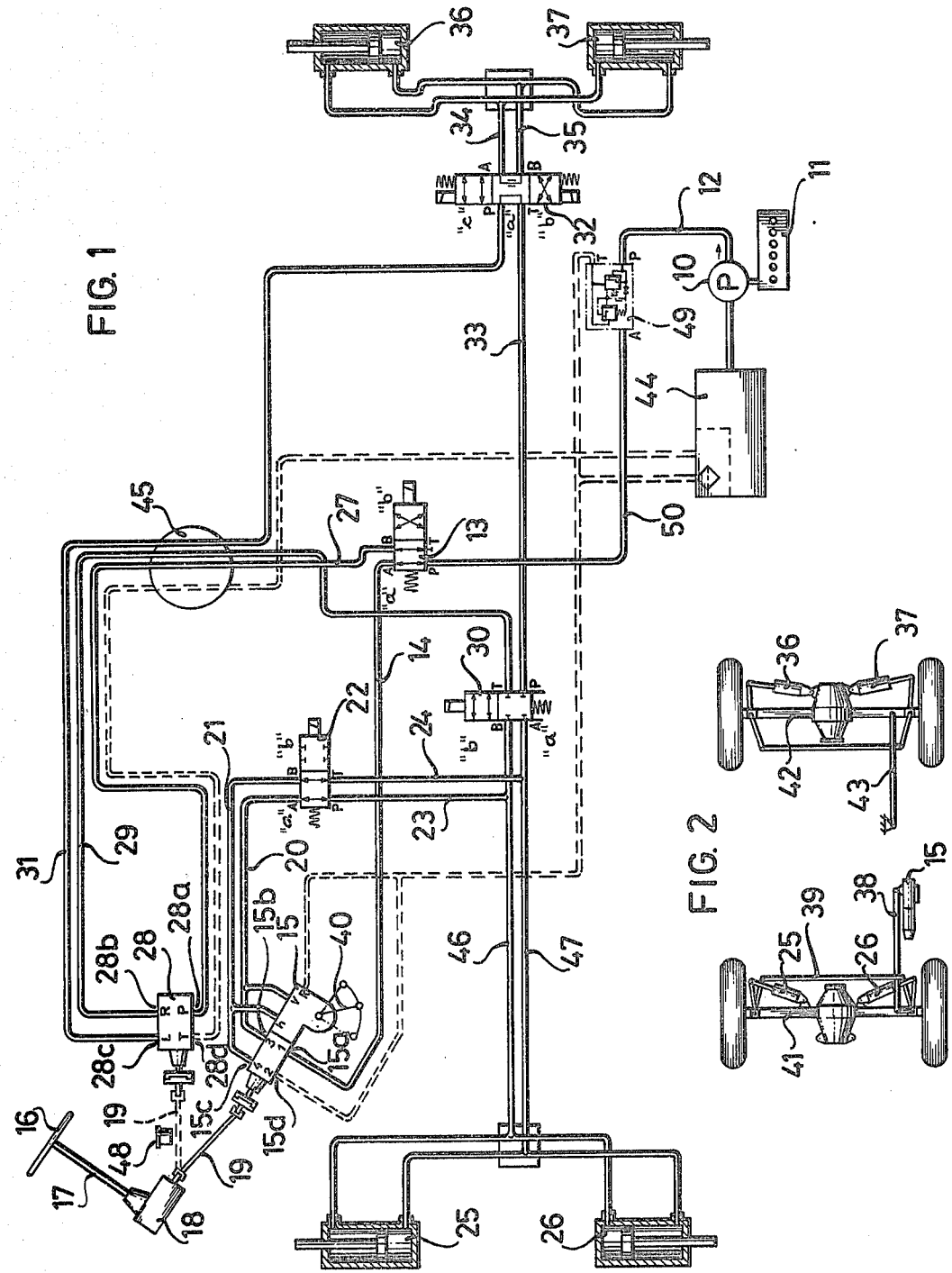

STEERING GEAR WITH STEERING DROP ARM

The invention relates to a steering gear with steering drop arm, steering tie rod and steering gear connecting tie rod for a vehicle which is drivable on the street or road and in terrain on wheels with a steering mechanism which is actuated selectively hydraulically supported mechanically or purely hydraulically by means of hydraulic cylinders and electromagnetic valves, whereby the changing over of the hydraulic supported system to the purely hydraulically operating system is brought about by means of a selective connection of a universal shaft, which is connected with the steering wheel, with one of the two systems which serve the actuation of the steering mechanism.

With vehicles which are supposed to be able to be driven on streets or roads as well as also on terrain, and with which in the terrain in addition to the steering of the front axle not only is a smallest radius of turning demanded—whereby the front axle and the rear axle are steered in opposite senses or directions but depending upon need also the two axles are to be steered offset with respect to one another, in a so-called "hound course" it is known that for the mechanical hydraulic or pure hydraulic actuation of the steering mechanism which is necessary therefor, two hydraulic pumps and two hydraulic circuits as well as a double steering gear are required. Such an arrangement is expensive and susceptible to failure.

It is an object of the present invention to make a mechanical hydraulic steering gear device, with which, depending upon need one axle is steered hydraulically supported or is steered purely hydraulically or both axles are steered purely hydraulically, and furthermore the "hound course" can be switched on, which device manages same with only a single hydraulic pump and a correspondingly small number of electromagnetically actuated control valves.

It is another object of the present invention to aid the solution of the above-mentioned object in the manner that a hydraulic pump (10), which is driven by a driving motor (11), and acting on both systems, is connected with a control valve (13) via a conduit (12), a flow control- and pressure- limit valve (49) and a conduit (50). On the one hand a line (14) leads from the first control valve to a steering transmission (15), the latter being actuated by the steering gear (16, 17, 18) by means of universal shaft (19). Lines (20 and 21) lead from the steering transmission (15) to a control valve (22). The latter is connected with the hydraulic cylinders (25 and 26) of the front axle (41) via lines (23, 24 and 46, 47). On the other hand a line (27) leads from the first control valve (13) to a steering valve (28), which valve is actuated by means of a steering gear (16, 17, 18) and the universal shaft (19). Pressurized oil either via a line (29) flows to a control valve (30) and via a line (46) flows to the hydraulic cylinders (25) and (26) of the front axle (41) or via a line (31) flows to a control valve (32) and via a line (33), the control valve (30) and a line (47) flows to the hydraulic cylinders (25 and 26). Or pressurized oil either via a line (29) flows to the control valve (30) and via a line (46) flows to the hydraulic cylinders (25 and 26) of the front axle (41) as well as via a line (47) flows to the third control valve (30) and via a line (33), the control valve (32) and a line (34 and 35, respectively) flows to the hydraulic cylinders (36 and 37) of the rear axle (42) or the pressurized oil via a line (31) flows to the control valve (32) and via a line (34 and 35, respectively) flows to the hydraulic cylinders (36 and 37) of the rear axle (42) as well as via a line (35 and 34, respectively) flows to the control valve (32) and via a line (33), the control valve (30) and a line (47) flows to the hydraulic cylinders (25 and 26) of the front axle (41).

The advantage of the arrangement in accordance with the invention is that the variable steering gear mechanism of a vehicle of the previously described type is achieved by means of one hydraulic circuit which is fed by only a single pump, and that by means of the series connection of the hydraulic cylinders, a synchronous operation of the wheels of the front axle and of the rear axle results without mechanical coupling between the two axles.

With the above and other objects and advantages in view, the present invention will become more clearly understood in connection with the detailed description of a preferred embodiment, when considered with the accompanying drawing, of which:

FIG. 1 is a circuit diagram of the steering gear with the hydraulic circuitry in accordance with the present invention; and FIG. 2 is a schematic plan view of the front and rear axles of a vehicle which is steered with the device according to FIG. 1.

From the hydraulic pump 10, which is driven by the motor 11, pressurized oil flows via the conduit 12, the flow control- and pressure limit- valve 49 and the conduit 50 to the slide control valve 13 and from there via the line 14 to the steering gear or transmission 15, the latter being actuated by means of the steering wheel 16, the steering column 17, the angle or guide pulley drive 18 and the universal joint 19. From the steering gear or transmission 15 the conduits 20 and 21 lead to the slide control valve 22, the latter standing in communication with the hydraulic cylinders 25 and 26 of the front axle 41 via the conduits 23 and 24 and via the conduits 46 and 47. Depending upon the position of the slide control valve 13, the pressurized oil which is supplied from the hydraulic pump 10 through the conduit 12, the flow control- and pressure limit- valve 49 and the conduit 50 to the slide control valve 13, instead of flowing through the conduit 14, flows through the conduit 27 to the steering or control valve 28, the latter being actuated by means of the steering gear 16, 17, 18 and the universal or cardan shaft 19, the latter being released or disconnected from connection with the steering gear or transmission 15 and having been connected with the steering valve 28. From the steering valve 28, via the conduit 29 pressurized oil is lead to the slide control valve 30 and via the conduit 46 to the hydraulic cylinders 25 and 26 of the front axle 41 or via the conduit 31 to the control slide control valve 32 and the conduit 33, the control valve 30 and the conduit 47 to the hydraulic cylinders 25 and 26 of the front axle 41. With the rear axle steering mechanism connected for operation, pressurized oil is led from the steering valve 28 either, via the conduit 29 to the control valve 30 and via the conduit 46 to the hydraulic cylinders 25 and 26 of the front axles 41 as well as via the conduit 47, the distribution regulator 30, the conduit 33, the distribution regulator 32 and the conduit 34 or 35 to the hydraulic cylinders 36 and 37 of the rear axle 42, or via the conduit 31, the distribution regulator 32 and the conduit 34 or 35 to the hydraulic cylinders 36 and 37 of the rear axle 42 as well as via the conduit 35 or 34 to the distribution regulator 32, via the conduit 33, the distribution regulator 30 and the conduit 47 to the hydraulic cylinders 25 and 26 of the front axle 41.

As evident from FIG. 2 and the previously described example, the front wheels of the front axle 41 of a vehicle with rubber tires can be steered mechanically with hydraulic support by means of the steering tie rod 39 and the steering gear connecting rod 38 from the steering gear drop arm of transmission 15 or can be steered purely hydraulically via the steering valve 28.

The manner of operation is as follows:

MECHANICAL STEERING SUPPORTED BY HYDRAULIC STEERING OF FRONT AXLE

For travelling on the streets or road the steering wheel 16 is connected with the steering gear or transmission 15 by means of the steering column 17, the angle drive 18 and the universal or cardan shaft 19; by means of the steering drop arm 40 the mechanical transmission of the movement of the steering wheel 16 to the front axle 41 is brought about. By means of the control valve which is arranged in the steering transmission 15 the hydraulic support of the steering operation takes place corresponding to the movements of the steering wheel 16, in the manner that the pressurized oil which is transported by the hydraulic pump 10 is supplied to the hydraulic cylinders 25 and 26 via the control valve 22 which is located in the position "a" as previously described. During road or street travelling the rear axle 42 is mechanically locked by means of the locking rod 43 and by means of the control valve 32 which is switched in the position "a", the two hydraulic cylinders 36 and 37 of the rear axle 42 are likewise located in a self-closed hydraulic circuit, that is, self-closed without communication elsewhere. The control valves 13, 22, 30 and 32 are automatically switched into the switching position "a" by means of an electric switch 48. If the steering wheel 16 is not actuated, the pressurized oil which is transported by the hydraulic pump 10 flows via the connection 15a and the connection 15d of the steering transmission 15 to the tank 44. Upon actuation of the steering wheel 16 the pressurized oil which is transported by the hydraulic pump 10 flows from the connection 15a of the steering transmission 15 via connection 15b or 15c to the hydraulic cylinders 25 and 26 of the front axle 41.

PURE HYDRAULIC STEERING OF:

(1) Front Axle

In the case of pure hydraulic steering, the universal or cardan shaft 19 is released or disconnected from the steering transmission 15 and is mechanically coupled with the steering valve 28. If only the front axle 41 is to be steered, the control valves 13, 22 and 30 are automatically positioned by the electric switch 48 in the switching position "b", while the control valve 32 is located in the switching position "a". Upon actuation of the steering wheel 16 the pressurized oil which is fed by the hydraulic pump 10 flows from the connection 28a of the steering valve 28 via the connection 28b or 28c to the hydraulic cylinders 25 and 26 of the front axle 41 as previously described. If the steering wheel 16 is not actuated, the pressurized oil from the hydraulic pump 10 flows via the swivel joint 45 to the steering valve 28, from the connection 28a toward the connection 28d and via the swivel joint 45 back to the tank 44. The swivel joint 45 is necessary to lead hydraulic oil from the slewing upper part of a crane to the undercarriage.

(2) Front And Rear Axles

In order to achieve a steering of the front axle 41 and of the rear axle 42 in the opposite sense and consequently the smallest possible turning radius, the distribution regulator 32 is manually switched into the switching position "c". The control valves 13, 22 and 30 automatically remain in the switching position "b". In order to achieve the "hound course", that is the same steering sense of the wheels of the front axle 41 and the rear axle 42, the control valve 32 is manually switched into the control position "b". The control valves 13, 22 and 30 automatically remain in the switching position "b".

While I have disclosed one embodiment of the invention it is to be understood that this embodiment is given by example only and not in a limiting sense.

We claim:

1. In a steering gear with steering drop arm, steering tie rod and steering gear connecting tie rod for a vehicle which is drivable on the road and in terrain on wheels, with a steering mechanism which is actuated selectively hydraulically supported mechanically or purely hydraulically by means of hydraulic cylinders and electromagnetic valves, and a universal shaft which is connected with the steering wheel changing from the hydraulically supported system over to the purely hydraulically operating system by selectively connecting said universal shaft with one of two systems which serve the actuation of the steering mechanism, wherein in combination.

one of said systems comprises a steering transmission and the other of said systems includes a steering valve, said steering transmission and said steering valve being selectively actuated by said steering gear by selective connection with said universal shaft, respectively, said hydraulic cylinders include hydraulic cylinders of a front axle and hydraulic cylinders of a rear axle of the vehicle, a hydraulic pump operatively connected to both of said systems, motor means for driving said pump, a plurality of control valves, a flow control- and pressure limit- valve, a first conduit being connected to the latter and to said pump, a second conduit connected between said flow control- and pressure limit- valve and a first of said control valves, a first line being connected to said first control valve and to said steering transmission, second lines are connected to said steering transmission to a second of said control valves, third lines connecting said second control valve with said hydraulic cylinders of a front axle of the vehicle, a fourth line being connected to said first control valve and to said steering valve, a first selective operative pressurized oil flow path comprising in order: a fifth line being connected to said steering valve and a third of said control valves, said third control valve, and a sixth line being connected to said hydraulic cylinders of the front axle;

a second selective operative pressurized oil flow path comprising in order: a seventh line being connected to said steering valve and to a fourth of said control valves, said fourth control valve, an eighth line being connected to said third and fourth control valves, said third control valve, and a ninth line being connected to said third control valve and to said hydraulic cylinders of the front axle;

tenth lines connecting said fourth control valve with said hydraulic cylinders of the rear axle, a third selective pressurized oil operative flow path comprising in order: said fifth line connecting to said third control valve, said sixth line connecting to said hydraulic cylinders of the front axle, said ninth line connecting to said third control valve, said third control valve, said eighth line, said fourth control valve, and one of said tenth lines connecting to said hydraulic cylinders of the rear axle;

a fourth selective operative pressurized oil flow path comprising in order: said seventh line connecting to said fourth control valve, said fourth control valve, one of said tenth lines connecting to said hydraulic cylinders of the rear axle, the other of said tenth lines connecting to said fourth control valve, said fourth control valve, said eighth line, said third control valve, and said ninth line connecting to said hydraulic cylinders of the front axle;

said control valves being selectively switched such that any one of said selective operative flow paths is operative with flow of pressurized oil therethrough.

2. The steering gear mechanism as set forth in claim 1, further comprising a rear wheel steering mechanism including means for inoperatively locking the latter, said rear wheel steering mechanism being operatively connected to said hydraulic cylinders of said rear axle, one of said first and second selective pressurized oil flow paths, respectively, being operative when said rear wheel steering mechanism is locked inoperative.

3. The steering gear mechanism as set forth in claim 1, further comprising a rear wheel steering mechanism including means for inoperatively locking the latter, said rear wheel steering mechanism being operatively connected to said hydraulic cylinders of said rear axle, one of said third and fourth selective pressurized oil flow paths, respectively, being operative when said rear wheel steering mechanism is locked operative.

4. The steering gear mechanism as set forth in claim 1 wherein said hydraulic pump is a single pump.

5. The steering gear mechanism as set forth in claim 1 wherein said steering transmission includes means for mechanically steering said front axle when connected with said universal shaft and includes means for operatively selectively communicating said first line with said second lines, respectively, for the hydraulic supported steering when the universal shaft is connected with said steering transmission and the steering gear is actuated, said second control valve is selectively switched to operatively connect said second lines with said third lines only when the universal shaft is connected with said steering transmission.

said steering valve constitutes means for operatively selectively communicating said fourth line with said fifth and seventh lines, respectively, when the universal shaft is connected with said steering valve and the steering gear is actuated.

* * * * *